C. H. CARTER & J. E. BROWNE.
Assignors to E. B. FINCH.
CHANDELIERS.
Reissued Oct. 3, 1876.
No. 7,329.
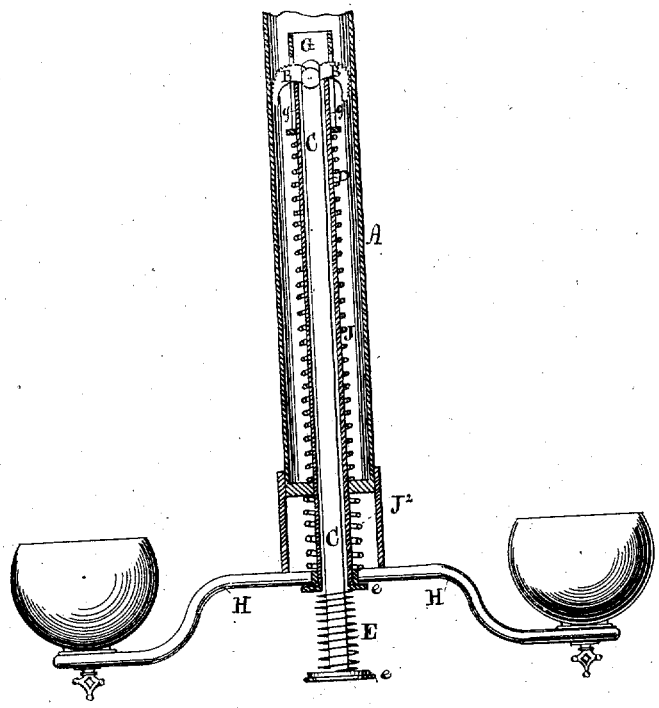
Witnesses
Wm H Smith
C M Connell
Inventors
C. H. Carter
J. E. Browne
Per. Blanchard & Singleton
Attys

UNITED STATES PATENT OFFICE.

CHARLES H. CARTER, OF BROOKLYN, NEW YORK, AND JAMES E. BROWNE, OF NEWARK, NEW JERSEY, ASSIGNORS TO E. B. FINCH, OF PEEKSKILL, NEW YORK.

IMPROVEMENT IN CHANDELIERS.

Specification forming part of Letters Patent No. 178,733, dated June 13, 1876; reissue No. 7,329, dated October 3, 1876; application filed August 19, 1876.

*To all whom it may concern:*

Be it known that we, CHARLES H. CARTER, of Brooklyn, county of Kings and State of New York, and JAMES E. BROWNE, of Newark, county of Essex and State of New Jersey, have invented certain Improvements in Extension-Chandeliers, whereby they may be constructed of a more compact and sightly form than heretofore; and we declare the following to be a full, clear, and exact description of the same.

Our invention consists in a novel and unusually compact manner of constructing and arranging of the various parts, whereby provision is made for readily raising or lowering the body or arm of the chandelier, adjusting and supporting the same at height required without any external unsightly appliances, all as hereinafter described.

The accompanying drawing is a vertical sectional view of an extension-chandelier embodying our improvement, in which A represents the tubing or case of the chandelier upright, usually termed the rod, as ordinarily constructed, adapted for suspension, which tubing or case on its inner surface furnishes bearings for the working parts of a checking or supporting device, which may be of various modes of construction. The one here shown consists of the lever-like cams B. These cams are carried by the sliding tube D, being hung to its upper edge by means of the cap G. In the sliding tube D is the central rod C, which is simply for the operating of the cams B, they being pivoted by their inner ends to its upper end. At or near the lower end of the sliding tube D, the body or arms of the chandelier are attached and move with it. The outer ends of the cams, being the heaviest, have a tendency to drop down and inward, except for the weight of the operating-rod C hanging to their inner ends; but in order to the more surely keep them pressed outward, with their faces bearing against the inner surface of the case A, we provide a spring attached to the operating-rod C, in such a manner as to exert a downward pressure upon the rod, thus carrying the inner ends of the cams B attached to it downward, and the outer ends upward and outward until their faces or bearing-surfaces come in contact with the inner surface of the case A. The spring may be of any construction that will accomplish the purpose. It is here shown as a spiral spring, E, arranged near the lower end of the operating-rod C, working between two seats, *e e*, one attached to the rod and the other to the sliding tube D. This arrangement provides for the convenient operating of the rod, as the seats *e e* may be grasped by the thumb and finger, compressing the spring between them, thus raising the operating-rod C, and thereby releasing the cams B from bearing against the case A, and allowing the sliding tube D, with the body or arms H H attached, to be lowered at will. At the upper end of the tube D the cap G is provided with slots *g*, in which the cams B are hung and work. The upper ends of the slots *g* form bearings for the upper edges of the cams, preventing them from being forced outward too far, also assisting to press them toward each other when the rod is pushed upward.

The chandelier is provided with a spring or springs, arranged in any suitable manner, for taking the weight and for letting the chandelier down gently. There may be a spring, J, arranged inside the pendant or chandelier case A, and operating by compression, or a spring, $J^2$, arranged outside and operating by expansion; or both may be used, arranged to co-operate with each other. When the spring $J^2$ is used it may be covered by a tube, working telescopically with relation to the case A.

A chandelier constructed as above described is operated as follows: When it is desired to lower the chandelier, the rod C is pressed upward within the sliding tube D, withdrawing the faces of the friction-cams from contact with the bearing-surface of the case A, allowing of the lowering of the sliding tube D with the attached arms H H. When the desired adjustment is obtained the pressure is removed from the rod C, which, by reason of its weight and of the spring E, descends, causing the cams to swing outward until their bearing-surfaces are again brought in contact with the inner surface of the case A, with sufficient friction to support the sliding tube D and attached arm at any height to which it may be adjusted. When it is desired to raise the chandelier-arm H H, it is simply pushed upward until the desired height is reached, as the shape and arrangement of the cams are such as to permit of their slipping over the bearing-surface without friction when moving upward. As soon as the upward pressure is removed they act upon the case A, as herein-before described, sustaining the chandelier at its then height.

The sliding tube D may be arranged to carry any required number of arms.

Instead of the cams operating by friction, as herein described, two or more pointed levers may be used, and the bearing-surfaces of the pendant may be notched or serrated to receive the points of said levers, so that the motion of the chandelier may be arrested or checked by the engagement of said levers with said notches or serrations.

What we claim, and desire to secure by Letters Patent, is—

1. The movable central rod C, for the operating at will of a checking or supporting device.

2. The checking or supporting device, operated by a centrally-located movable rod.

3. The combination, with the rod C and cams or supporting levers B, of the sliding tube D and cap G, for regulating and limiting the motion of the cams, substantially as herein described.

CHAS. H. CARTER.
JAMES E. BROWNE.

Witnesses:
W. D. FOZARD,
HENRY MANDEVILLE.